United States Patent [19]

Gilbert

[11] Patent Number: 4,646,776
[45] Date of Patent: Mar. 3, 1987

[54] THREE-WAY VALVE

[75] Inventor: Charles H. Gilbert, Pomona, Calif.

[73] Assignee: Techcon Systems, Inc., Carson, Calif.

[21] Appl. No.: 649,881

[22] Filed: Sep. 13, 1984

[51] Int. Cl.⁴ .......................................... F16K 15/20
[52] U.S. Cl. ..................................... 137/226; 222/389
[58] Field of Search ................ 137/596, 596.1, 627.5, 137/868, 226; 222/389, 399; 251/231, 149.6, 149.7

[56] References Cited

U.S. PATENT DOCUMENTS

| | | | |
|---|---|---|---|
| 1,318,674 | 10/1919 | Knoll | 251/149.6 |
| 3,146,916 | 9/1964 | Kronheim | 137/627.5 |
| 3,439,839 | 4/1969 | Schumann et al. | 222/389 |
| 3,603,487 | 9/1971 | Cook | 222/389 |
| 4,338,793 | 7/1982 | O'Hern | 251/149.6 |
| 4,426,022 | 1/1984 | Lang et al. | 222/389 |

FOREIGN PATENT DOCUMENTS 466761  6/1937  United Kingdom ............ 137/596.1

Primary Examiner—Samuel Scott
Assistant Examiner—Noah Kamen
Attorney, Agent, or Firm—Nilsson, Robbins, Dalgarn, Berliner, Carson & Wurst

[57] ABSTRACT

An apparatus utilizing a conventional pneumatic tire valve mounted concentrically within a resilient seal for cooperative action with a seat structure to accomplish three-way valve operation effective in pressurizing and relieving a chamber of a dispensing gun as for mastic material. A valve seat member: defines a flow passage, affords a flat surface about the passage for seating engagement with the resilient seal member, and receives a set screw for engaging the core of the conventional tire valve. The tire valve and the resilient seal member are fixed on a handle that is pivotably mounted with respect to the seat member to afford relative motion with respect to the seat member for variously actuating the valve.

4 Claims, 6 Drawing Figures

THREE-WAY VALVE

BACKGROUND AND SUMMARY OF THE INVENTION

The need frequently arises for valving apparatus to alternately pressurize and relieve a fluid chamber. For example, the need arises for such valving apparatus in dispensing guns, as for paste, mastic and other flowable substances. Connected to a source of air under pressure, such a three-way valve has three states. In the quiescent state, the gun is relieved and the pressure source is isolated. In an intermediate state, a relief passage is closed while the pressure source is still isolated. In the third state, the relief passage is closed and a pressure passage is open for pressurizing the dispensing gun. Usually after an interval of operation, the sequence is reversed returning the valve to the quiescent state in which the pressurizing passage is closed and the relief passage is open. Again to avoid blow off, the pressure passage is closed before the relief passage is opened.

A variety of three-way valve arrangements for operation as described above have been previously proposed. Some such prior structures incorporated a conventional pneumatic tire valve core. Specifically for example, such valves are disclosed in U.S. Pat. Nos. 2,838,210 and 3,237,814. However, in spite of the development of such prior devices, a need continues to exist for an economical, durable and effective three-way valve for use in pressuring-relieving applications.

In general, the present invention incorporates a conventional pneumatic tire valve mounted for cooperative movement and operation with a resiliently deformable member affording a second valve closure to accomplish three-way operation. A simple support structure defines valve ports, serves as a seat for the resiliently deformable member and mounts a set screw to actuate the pneumatic tire valve core.

BRIEF DESCRIPTION OF THE DRAWINGS

In the drawings, which constitute a part of this specification, an exemplary embodiment demonstrating the various objectives and features hereof is set forth as follows.

DESCRIPTION OF THE ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment. Consequently, the specific structural and functional details disclosed herein are merely representative, yet in that regard are deemed to provide the best embodiment for purposes of disclosure and to provide a basis for the claims herein which define the scope of the present invention.

Figure 1:
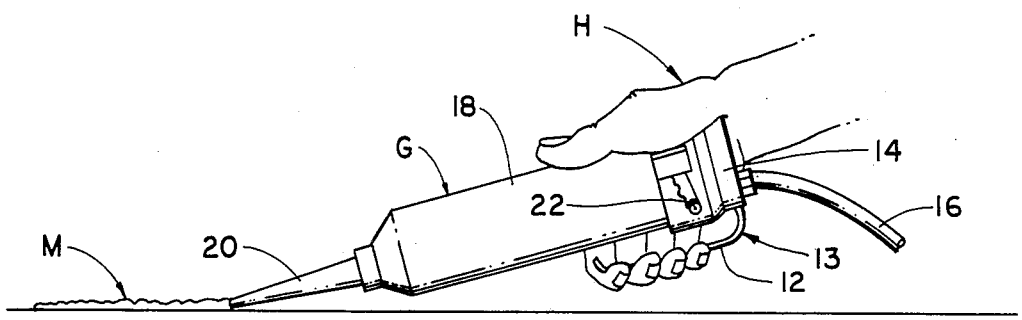
FIG. 1 is a perspective view of a dispenser gun incorporating a valving structure in accordance with the present invention.

Referring initially to FIG. 1, a dispensing gun G is illustrated discharging a flowable medium M under control of an operator's hand H. Essentially, the operator actuates a handle 12 incorporated as a lever 13 (under the fingers) to accomplish valving operations in a head 14 at the back of the gun G. Moving the handle 12 toward the gun G first closes the interior of the gun to ambient pressure, then opens the gun to the pressure in an air line 16. The result is to pressurize the interior of a barrel 18. As a consequence, material M is forced from the barrel 18 through a nozzle 20.

To halt the discharge of material M, the operator releases the handle 12 which again accomplishes two distinct valving operations. First, the pressure line 16 is isolated from the barrel 18. Second, the barrel 18 is relieved to atmospheric pressure.

In the illustrative embodiment, the mechanism for accomplishing the valving operations is embodied in the head 14 of the gun G which is affixed to the barrel 18 by a pin and slot coupling 22. Details of the head 14 are illustrated in FIG. 2 and the related valving functions are schematically represented in FIG. 3.

Figure 3:
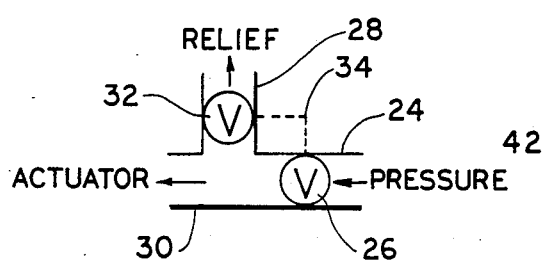
FIG. 3 is a diagram illustrating the operation of the valving mechanism illustrated in FIG. 2.

Considering the functional operation of the three-way valve as disclosed herein, FIG. 3 illustrates a pressure intake passage 24 containing an intake valve 26. The passage 24 enters a junction defined by a relief passage 28 and an actuator passage 30. The relief passage 28 contains a relief valve 32. The valves 26 and 32 are mechanically inter-coupled as indicated by a dashed line 34.

Figure 2:
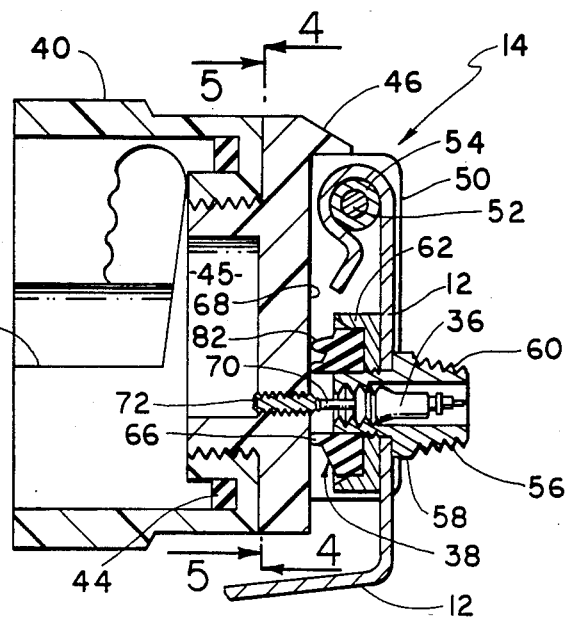
FIG. 2 is a vertical sectional view taken centrally through a part of the dispensing gun of FIG. 1.

The valve structure, as illustrated in FIG. 2, performs functions which are readily explained with reference to FIG. 3. In a quiescent state, the valve 26 is closed isolating the pressure passage 24. Concurrently, the valve 32 is open allowing the relief passage 28 to relieve the actator passage 30.

To power the actuator, the relief valve 32 is first closed after which the pressure valve 26 is opened to provide a conduit from the pressure passage 24 to the actuator passage 30. Consequently the actuator is driven to accomplish the desired result, e.g. discharge material M. At the conclusion of the desired discharge, the valve 26 is closed, isolating the pressure passage 24, after which the relief valve 32 is opened relieving the actuator passage 30. Such is the cycle of the mechanism in the head 14 for three-way operation as will now be described.

Referring to FIG. 2, the pressure valve is provided in the form of a pneumatic tire valve core 36 as well known in the prior art and sometimes called a "Schrader" valve. The relief valve 32 as illustrated in FIG. 3 is provided by a resiliently deformable, circular seal structure 38 concentrically encircling the valve 32. The details of these distinct valving structures will now be considered along with the related components of the head 14.

The head 14 comprises a substantially cylindrical body 40 and a threadably mated end cap 46. Alternatively, the units 40 and 46 could be molded or fabricated in one piece. The body 40 matingly receives the barrel 18 (FIG. 1) for material M. The cylindrical body 40 may be formed of a variety of materials, including plastic, utilizing any of various forming techniques. At diametrically opposed locations, the body 40 defines locking slots 42 providing one element of the coupling 22 (FIG. 1) for the barrel 18. Upon engagement, the rim of the barrel (not shown) abuts a gasket 44 (FIG. 2) in an annular recess of the body 40 to close the barrel along with a cylindrical space 45 defined in the cap 46.

Figure 4:
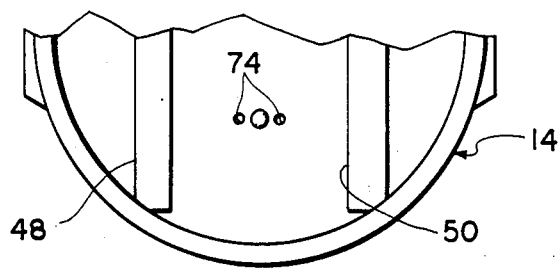
FIG. 4 is a sectional view taken along line 4—4 of FIG. 2.

The body 40, closed by the threadable cap 46, also serves to support the dynamic valving elements. The cap 46 is generally circular defining a pair of parallel external risers 48 and 50 (FIGS. 2 and 4). A pin 52 (FIG. 2) is affixed to extend between the risers 48 and 50 for pivotally mounting the handle 12 on a bearing 54. The handle 12 carries both the valve core 36 and the seal structure 38 as will now be considered in detail.

The valve core 36 is threadably received in a valve stem 56 (FIGS. 2, 5, and 6) which is in turn threadably locked in a bore through the handle 12. The stem 56 (FIG. 2) defines an exterior boss 58 for abutting engagement at the exterior surface of the handle 12. Outward from the boss 58 the stem 56 carries threads 60 for coupling the stem to the line 16 (FIG. 1).

Figure 5:
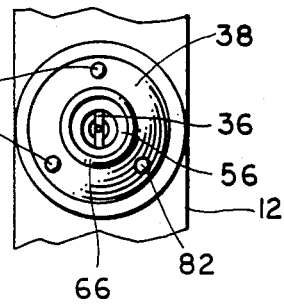
FIG. 5 is a sectional view taken along line 5—5 of FIG. 2.
Figure 6:
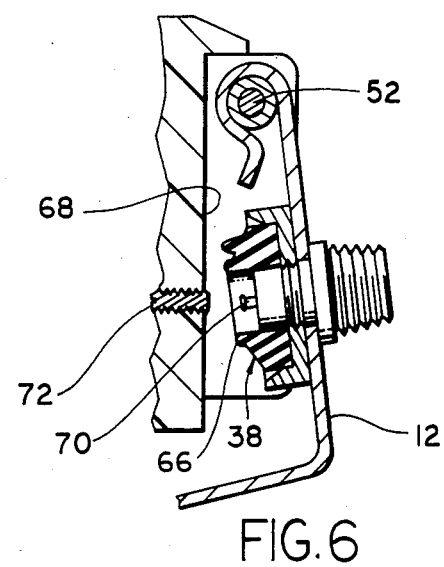
FIG. 6 is a fragmentary view similar to FIG. 2 showing the valve mechanism in a different positional configuration.

Inside the handle 12, the stem 56 threadably receives a keeper 62 which matingly receives a seal structure 38 (FIGS. 2, 5, and 6). The seal structure 38 is formed of resiliently deformable or elastomeric material and is generally open and circular in shape. The seal structure 38 is substantially cylindrical becoming tapered at a conical, frustum section terminating in an angular lip 66 (FIGS. 2, 5, and 6). Note that the seal structure 38 is bonded to the keeper 62.

When the seal structure 38 is closed, the lip 66 seats against a flat surface 68 of the cap 46 (FIG. 2). From that position, the central pin 70 in the valve core 36 may engage a set screw 72 for opening a passage through the stem 56. Fluid received through the stem 56 passes through ports 74 (FIG. 4) defined in the cap 46. Note that functionally, the set screw 72 adjusts the opening position to allow for manufacturing tolerances.

The gun G as described above may be manufactured utilizing a wide variety of different techniques and materials. In an existing embodiment, the barrel 18 (FIG. 1) accommodates sealed cartridges which are readily available on the market and which incorporate the nozzel 20. Such cartridges usually include a free piston (not shown) to travel the length of the barrel 18 as material is discharged.

The existing embodiment of the gun G is generally formed of rigid plastic and metal components. The body 40 and the cap 46 are of high impact plastic and may be formed using any of a variety of production techniques. The handle 12 comprises rigid metal plate bent to the illustrated configuration. The seal structure 38 (FIG. 2) comprises an elastomeric or rubber-like material to accommodate resilient deformation. The valve core 36 simply comprises a readily available commercially standard pneumatic tire valve core. The individual components are fitted and assembled after which the set screw 72 is adjusted to engage the pin 70, only after the seal structure 38 is well seated against the cap 46.

In view of the structural description of the gun G as set out above, a complete understanding thereof may now best be accomplished by assuming certain initial conditions and describing a sequence of operation. Accordingly, assume that the gun G contains a flowable, paste-like material M within the barrel 18 which, as indicated, may be provided in the form of a cartridge incorporating the nozzle 20.

Assume further that the line 16 (FIG. 1) is connected to a source of air under pressure, for example approximately 100 psi or greater. In that regard, note that the head 14 of the gun can be safely and easily removed from the barrel 18 (as to add material M) by disengaging the coupling 22 while the line 16 is pressurized. Thus, the barrel 18 may be conveniently and easily refilled without relieving the line 16 because the valve core 36 closes the line.

With the gun ready for operation, it is positioned as illustrated in FIG. 1 preparatory to discharging material M. Initially, the operator's hand loosely holds the gun G, not squeezing the handle 12. The valving mechanism is accordingly in its quiescent state, the configuration of the valve being as illustrated in FIG. 6. Analogizing to diagram FIG. 3, the intake valve 26 is closed while the relief valve 32 is open. The specific configuration will now be treated.

As illustrated in FIG. 6, the handle 12 hangs freely on the pivot pin 52 with the consequence that the seal structure 38 is separated from the surface 68. Accordingly, the seal is open, analogous to the relief valve 32 (FIG. 3) being open.

At the same time, the valve core pin 70 (FIG. 6) is spaced apart from the set screw 72. Consequently, the pin 70 is disengaged and a spring (not shown) within the valve core 36 maintains the passage through the stem 56 closed. Such closure is analogous to the closed valve 26 of FIG. 3.

Thus, in the quiescent state, the pressure intake is closed by the core 36 (FIG. 6) and the relief valve (defined by the seal structure 38) is open. That is the space between the surface 68 and the seal structure 38 allows the interior of the barrel 18 as the space 45 to be relieved through ports 74 (FIG. 4). Note that the ports 74 are obscured in FIG. 6 by their alignment with the set screw 72.

From the quiescent state, as described above, consider the sequence upon the operator actuating the handle 12 (FIG. 1) against the barrel 18. As the handle pivots to close on the barrel 18, the elements become configured as illustrated in FIG. 2. Specifically, the seal structure 38 seats against the surface 68. Consequently, relief from the interior space 45 of the barrel 18 (FIG. 1) is closed which is analogous to closing the relief valve 32 of FIG. 3. Essentially, the ports 74 (FIG. 4) are closed by the seal structure 38 seating to define a small closed space about those ports.

The operator then begins to feel some resistance to further pivotal motion of the handle 12. Such resistance is offered by the resiliency of the seal structure 38 and affords the operator a sense of feeling the threshold and extent of a dispensing operation.

As the handle 12 is further pivoted to close on the barrel 18, the seal structure 38 deforms, permitting the valve pin 70 to engage the set screw 72. After such contact, further movement of the handle 12 actuates the pin 70 to open the valve core 36, which is analogous to opening the pressure valve 26 as illustrated in FIG. 3.

As the pressure valve of the core 36 is opened, air passes from the line 16 (FIG. 1): through the core 36, through the central opening of the seal structure 38 and through the ports 72 (FIG. 4). Accordingly, the space 45 (FIG. 2) receives air and the interior of the gun G is pressurized, forcing the material M from the nozzle 20. At the same time, the space inside the seal 38 (between the surface 68 and the valve stem) receives air pressure increasing the feel of back pressure to the operator enabling him to control and vary the pressure in the barrel 18 by the amount of pressure applied to the handle 12 similar to the action of a pressure regulator.

At the conclusion of a dispensing operation, the operator simply releases the handle 12. As a consequence, the resiliency of the seal structure 38 (FIG. 2) urges the handle 12 away from the surface 68. Such movement initially disengages the pin 70 from the set screw 72 to close the pressure passage through the stem 56. That occurrence is analogous to closing pressure valve 26 as illustrated in FIG. 3.

Further release of the handle 12 allows the resiliency of the seal structure 38 to return to its undistorted shape and finally the lip 66 (FIG. 6) separates from the surface 68. Consequently, the space 45 (within the barrel) is relieved which is analogous to opening the relief valve 32 as illustrated in FIG. 3. Consequently, the apparatus is returned to its quiescent state, the cycle of operation being complete.

Note that the structure affords the operator a good "feel" for controlling the discharge by reason of the seating of the resilient seal structure 38 and its relationship with the pin 70 actuating the valve core 36. In that regard, three elastomeric spacers 82 (FIG. 5) integral with the seal structure 38 afford increased resiliency at the critical point of closing. The spacers 82 space the seal 38 above the surface 68 to assure disengagement of the lip 66 from the surface 68 and provide positive relief of the pressure within the barrel 18.

In view of the above description, it may be seen that the valve mechanism of the present invention can be effectively used in a variety of applications, particularly with respect to devices operating on a pressurization-relief cycle. Of course, the system may be variously implemented and variously used depending on specific applications. Accordingly, the scope hereof shall not be referenced to the disclosed embodiment, but on the contrary, shall be determined in accordance with the claims as set forth below.

What is claimed is:
1. A three-way valve apparatus comprising:
a resiliently deformable seal member defining an annular lip about an opening of a central passage;
a pneumtic tire valve core including an actuator pin affixed concentrically in said passage with said pin extending toward said opening;
seating structure means for engagement with said lip and said pin; and
means for movably supporting said seal member and valve core with reference to said seating structure means to thereby engage the lip and pin against the seating structure means to close said lip and open said valve core, said means for movably supporting including:
an operating handle means supporting said seal member and valve core, and pivot means for pivotably supporting said handle means to pivot said seal and said valve care relative to the seating structure means.

2. A valve apparatus according to claim 1 wherein said resiliently deformable seal member comprises an elastomeric member for abutment with said seating structure means.

3. A valve apparatus according to claim 2 wherein said resiliently deformable seal member further comprises at least one spacer protruding toward said seating structure means.

4. A valve apparatus according to claim 2 wherein said resiliently deformable seal member further comprises a rigid keeper member matingly receiving said elastomeric member.

* * * * *